(12) United States Patent
Portisch et al.

(10) Patent No.: US 11,907,195 B2
(45) Date of Patent: *Feb. 20, 2024

(54) RELATIONSHIP ANALYSIS USING VECTOR REPRESENTATIONS OF DATABASE TABLES

(71) Applicant: SAP SE, Walldorf (DE)

(72) Inventors: Jan Portisch, Bruchsal (DE); Sandra Bracholdt, Dielheim (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/113,864

(22) Filed: Feb. 24, 2023

(65) Prior Publication Data
US 2023/0214375 A1  Jul. 6, 2023

Related U.S. Application Data

(63) Continuation of application No. 17/400,042, filed on Aug. 11, 2021, now Pat. No. 11,620,271.

(51) Int. Cl.
*G06F 16/22* (2019.01)
*G06F 16/28* (2019.01)
(Continued)

(52) U.S. Cl.
CPC ...... *G06F 16/2282* (2019.01); *G06F 11/3452* (2013.01); *G06F 16/211* (2019.01); *G06F 16/248* (2019.01); *G06F 16/2456* (2019.01); *G06F 16/285* (2019.01); *G06F 16/3347* (2019.01)

(58) Field of Classification Search
CPC ............... G06F 16/211; G06F 16/2237; G06F 16/2264; G06F 16/2282; G06F 16/2456; G06F 16/26; G06F 16/285; G06F 16/287; G06F 16/3347; G06F 17/16; G06F 11/3452
See application file for complete search history.

(56) References Cited

U.S. PATENT DOCUMENTS 5,974,412 A   10/1999  Hazlehurst et al.
6,424,969 B1   7/2002  Gruenwald
(Continued)

OTHER PUBLICATIONS

"Join Path Analysis," https://help.sap.com/doc/11517c6e24f5425daba9ef5c913a9872/2.0_corr/en-US/079c74db8f30413b9d2e144fdd3f4f62.html, printed Jun. 3, 2021, 2 pages.

(Continued)

*Primary Examiner* — Robert W Beausoliel, Jr.
*Assistant Examiner* — Cheryl M Shechtman
(74) *Attorney, Agent, or Firm* — Klarquist Sparkman, LLP

(57) ABSTRACT

A computer-implemented method includes representing a plurality of database tables as respective vectors in a multi-dimensional vector space, receiving an indication that a first database table represented by a first vector and a second database table represented by a second vector are related to each other, moving positions of the respective vectors representing the plurality of database tables in the multi-dimensional vector space in response to the indication, and grouping the plurality of database tables into one or more table clusters based on positions of the respective vectors representing the plurality of database tables in the multi-dimensional vector space.

18 Claims, 16 Drawing Sheets

(51) Int. Cl.
  *G06F 16/21* (2019.01)
  *G06F 16/2455* (2019.01)
  *G06F 16/33* (2019.01)
  *G06F 11/34* (2006.01)
  *G06F 16/248* (2019.01)

(56) References Cited

U.S. PATENT DOCUMENTS

| | | | |
|---|---|---|---|
| 6,847,966 | B1 | 1/2005 | Sommer et al. |
| 8,015,190 | B1* | 9/2011 | Bayardo ............. G06F 16/3347 707/741 |
| 10,997,228 | B2* | 5/2021 | Cai ..................... G06F 16/316 |
| 11,080,316 | B1 | 8/2021 | Das et al. |
| 2002/0095421 | A1 | 7/2002 | Koskas |
| 2006/0179051 | A1* | 8/2006 | Whitney ............. G06F 16/3347 707/999.005 |
| 2008/0205774 | A1* | 8/2008 | Brinker ................. G06F 16/353 382/225 |
| 2009/0216799 | A1 | 8/2009 | Manjrekar et al. |
| 2015/0242750 | A1 | 8/2015 | Anderson et al. |
| 2019/0130029 | A1 | 5/2019 | Cai et al. |
| 2019/0324968 | A1 | 10/2019 | Kelly et al. |
| 2020/0142916 | A1 | 5/2020 | Yishay et al. |
| 2021/0158176 | A1 | 5/2021 | Wan et al. |
| 2022/0207045 | A1* | 6/2022 | Castellanos ....... G06F 16/24573 |

OTHER PUBLICATIONS

Mary K. Pratt, "Low-Code and No-Code Development Platforms," https://searchsoftwarequality.techtarget.com/definition/low-code-no-code-development-platform, printed Jun. 9, 2021, 8 pages.

"SAP HANA Administration Guide for SAP HANA Platform," https://help.sap.com/viewer/6b94445c94ae495c83a19646e7c3fd56/2.0.04/en-US, printed Jun. 4, 2021, 8 pages.

"SAP HANA Landscape Redistribution with SPG," https://blogs.sap.com/2013/09/03/sap-hana-landscape-redistribution-with-sp6/, printed Jun. 3, 2021, 9 pages.

"SQL server IntelliSense and Autocomplete," https://codingsight.com/sql-server-intellisense-and-autocomplete/, printed Jun. 9, 2021, 16 pages.

"View (SQL)," Wikipedia, https://en.wikipedia.org/wiki/View_(SQL), printed Jul. 7, 2021, 3 pages.

Liu et al., "TableSeer: Automatic Table Metadata Extraction and Searching in Digital Libraries," Jun. 2007, pp. 91-100.

Deng et al., "Table2Vec: Neural Word and Entity Embeddings for Table Population and Retrieval," Jul. 2019, pp. 1-4.

Liu, "TableSeer: Automatic Table Extraction, Search and Understanding," Pennsylvania State University, Dec. 2009, pp. 1-171.

"Communication—Extended European Search Report" from the European Patent Office for European Application No. EP22187533.9-1203, dated Nov. 29, 2022, 7 pages.

* cited by examiner

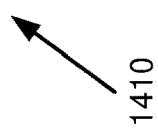
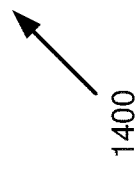
FIG. 14

RELATIONSHIP ANALYSIS USING VECTOR REPRESENTATIONS OF DATABASE TABLES

CROSS-REFERENCE TO RELATED APPLICATIONS

The present application is a continuation of U.S. patent application Ser. No. 17/400,042, filed Aug. 11, 2021, which is incorporated by reference herein.

BACKGROUND

Database management has evolved from a centralized approach where corporate data are stored in one (or very few) large servers to a distributed approach where a distributed database management system governs the storage and processing of logically related data over interconnected computer systems in which data can be distributed among many host machines (also referred to as "nodes") that are connected and form a network. For distributed database management, finding database tables that are semantically similar or related is important for a number of applications. However, existing technologies for measuring table relationship are complex and/or ineffective. Thus, room for improvements exists for quantitative analysis of table relationship in relational and/or columnar databases.

BRIEF DESCRIPTION OF THE DRAWINGS

FIG. 14 is a diagram comparing an example table relationship matrix and an example three-dimensional vector distance matrix involving three database tables.

DETAILED DESCRIPTION

Figure 1:
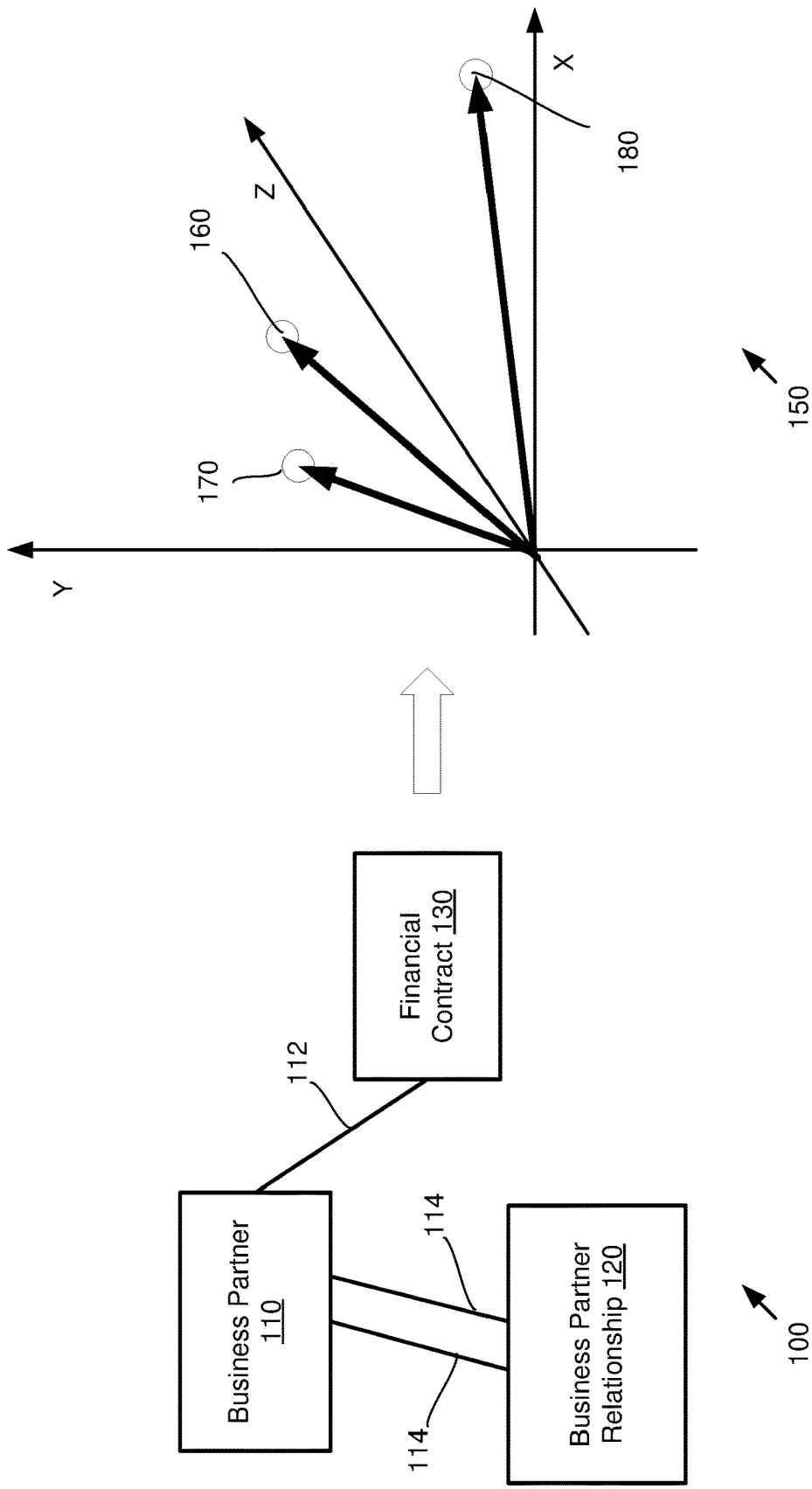
FIG. 1 is an example illustration of distance-based table relationship analysis based on multi-dimensional vector representation of database tables.

Example 1—Overview of Table Relationship Analysis in Relational and Columnar Databases For distributed database management, one challenging task is table placement, e.g., to determine which tables should be placed at which nodes. Table placement can have a significant impact on the performance of enterprise applications. For example, if database tables that are regularly joined are stored on separate nodes, they will have to be sent across the network when SQL statements are executed, which can cause slower calculation and undesired delay due to network latency. Thus, one general guiding principle for table placement is that tables which are frequently used together should be placed together so that the join can be locally optimized and executed.

There are also circumstances when tables or partitions of tables originally stored in one node need to be moved to other nodes. For example, the tables and partitions which grow fast in size may need to be split and redistributed among nodes. Table redistribution can balance the workload across all host machines and optimize the location of tables and partitions so that tables which are often used together are located on the same node. In any of the examples described herein, the terms "optimize," "optimal," and the like are used to describe finding a better solution out of a plurality of possible solutions; an actual best solution may or may not be found by optimization.

Manually placing the tables in respective nodes is not realistically feasible when a distributed database contains thousands or more tables and numerous relations between these tables. For automatic table placement, some conventional techniques require calculation of a matrix which measures statistical relationship between all possible pairs of database tables. For example, for a database including M database tables, an M-by-M table relationship matrix can be constructed where each element in the matrix measures a count of join operations performed in a period of time that involve two tables identified by the row and column of the element. Tables that are closely related to each other can be derived from such table relationship matrix. For example, a distance metric can be calculated between each pair of database tables based on the table relationship matrix, where a smaller distance indicates the two corresponding database tables are more frequently used together, and vice versa.

However, such techniques are not scalable because they require constant update of the table relationship matrix (which is associated with complex calculations) when a large database is frequently updated, e.g., by adding new tables to and/or deleting tables from the database. Further, such a table relationship matrix can only measure direct relationship between two tables (e.g., a join operation directly involving two tables). When two database tables are indirectly joined via one or more intermediary tables (i.e., the two database tables are joined by more than one "hop"), distances between the tables cannot be easily obtained from such table relationship matrix, and very complex calculations must be involved to take into account such intermediary tables.

Besides table placement, to support informed decision-making in an organization, it is important to understand which tables are related (or close) to each other from a business point of view. For example, two database tables should be used/viewed/considered together technically or businesswise even if they are rarely invoked together in a join operation. Quantification of relationship (or distance) between database tables can also be useful for development of database tools, e.g., for SQL editors or database analytical software. As an example, a table "proposal" feature can be incorporated in a database tool (similar to the auto-complete feature in a text editor) which hints or recommends to a user what tables can be used for a join statement. Such a table "proposal" feature can be particularly helpful in low-code/no-code development platforms which provide simple user interfaces for developers to easily develop database applications, even if they have limited knowledge about the database tables and their complex relations. Furthermore, determining which tables are semantically related to each other can be critical for efficient database integration as well as many advanced data analytics tools.

Thus, it would be advantageous to have an improved system and related methods that can quantitatively, efficiently, and accurately analyze relationship between tables in a relational or columnar database. Such improved table relationship analysis technologies can be applied across a wide variety of enterprise software environments.

Example 2—Example Distance-based Table Relationship Analysis Using Multi-Dimensional Vector Representation of Database Tables The technology described herein allows measurement of usage proximity or distance between any pair of database tables by representing (also referred to as "embedding") the tables in a multi-dimensional vector space using a systematic process. Specifically, in a database system, each table T can be represented as a vector $V_T=[x_1, x_2, \ldots, x_N]$ in a multi-dimensional vector space, wherein N is the dimension of the space. As described herein, the elements in the vector V T can be latent, i.e., the meaning of individual vector elements and how they relate to the data contained in the table T may not be immediately apparent to or understood by a human observer. The relationship (or similarity) between two tables, e.g., R and S, can be analyzed by a distance between two vectors, e.g., $V_R$ and $V_S$, which respectively represent the two tables R and S. In other words, the smaller the distance, the more closely R and S are related to each other and they more likely used together in the same context.

FIG. 1 is an example illustration of distance-based table relationship analysis based on multi-dimensional vector representation of database tables. In this example, the diagram 100 on the left shows three related database tables, i.e., business partner table 110, business partner relationship table 120, and financial contract table 130. The diagram 100 also illustrates the number of join operations involving those tables (as indicated by the line connecting the tables), e.g., one join operation 112 between tables 110 and 130, and two join operations 114 between 110 and 120.

The tables and their relationship depicted in diagram 100 can be embedded in a vector-space representation depicted in 150. In this example, for purposes of simplicity and visualization, the three tables 110, 120, and 130 are respectively represented by three vectors (also referred to as "table vectors") 160, 170, and 180 in a three-dimensional space, although it is to be understood that the table vectors can be embedded in a space with higher dimensions (e.g., N>3).

Because the vector space representation of database tables can be automatically constructed, a notion of relatedness or similarity between the vector tables is typically present even though such notion is not available when examining the original database tables (e.g., relatedness cannot be determined by just looking at the data records in the tables). For example, the relatedness or similarity between the table vectors 160, 170, and 180 can be measured based on their relative positions in the vector space, e.g., by measuring distances and/or angles between those vectors. Vectors that are clustered in the space indict their represented tables are closely related. Conversely, vectors that are located farther apart in the space indicate their represented tables are not closely related.

In the depicted example, it can be found that vector 160 is positioned closer to the vector 170 than to the vector 180. Such positioning of the vectors can be result of moving vectors in the space in response to the join operations 112, 114, according to the algorithm described below. Thus, it can be inferred that the business partner table 110 is more closely related to the business partner relationship table 120 than the financial contract table 130.

Figure 2:
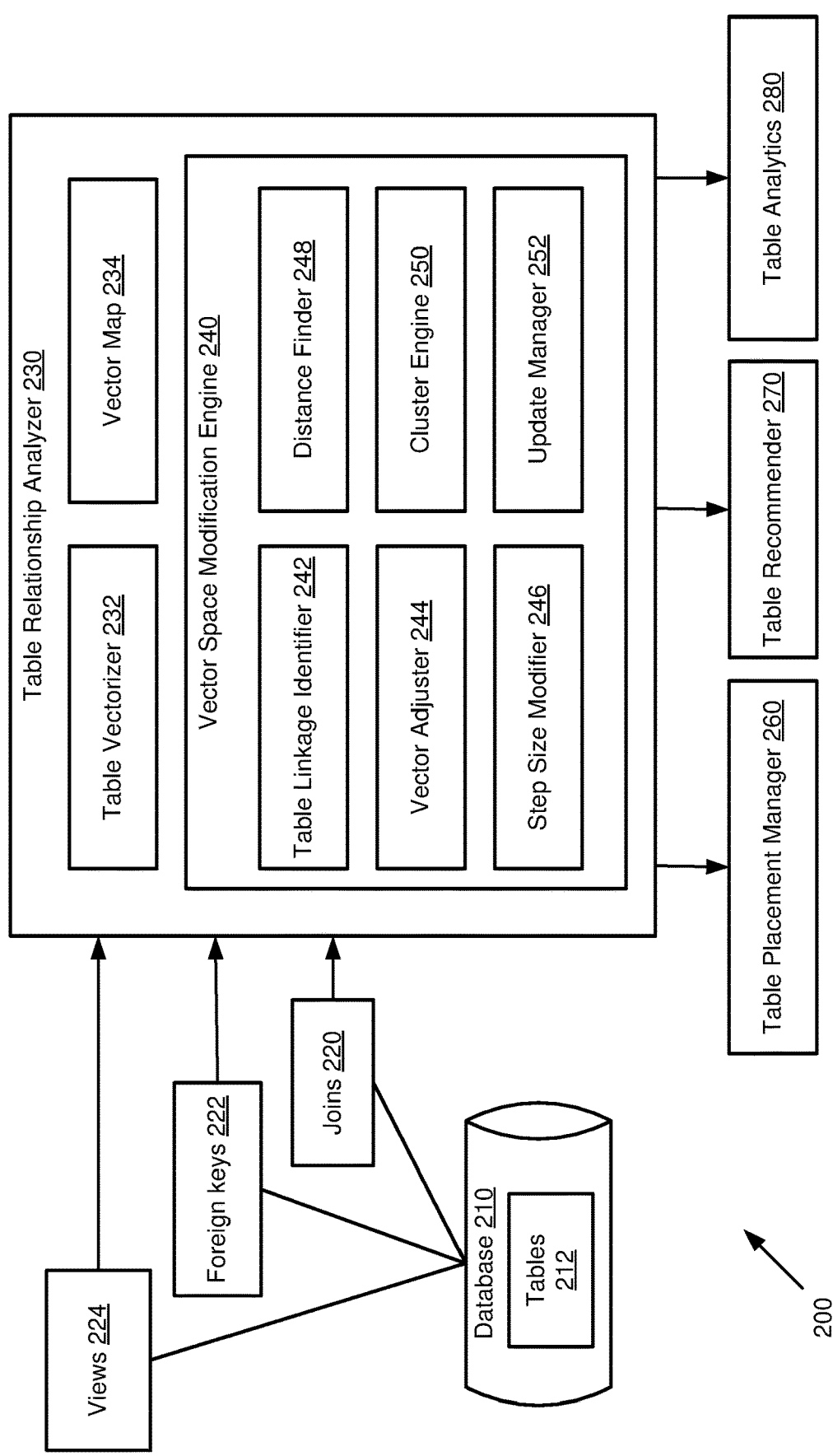
FIG. 2 is an overall block diagram of an example system configured to analyze relationship between database tables and apply such analysis in some example applications.

Example 3—Example Overview of a System for Relationship Analysis Using Vector Representation of Database Tables FIG. 2 shows an overall block diagram of an example system 200 configured to analyze relationship between database tables and apply such analysis in some example applications.

As shown, the system 200 includes a table relationship analyzer 230 configured to perform relationship analysis of tables 212 contained in a database 210, which can be a relational database which stores rows of data, a columnar database which stores records of data in columns, or the like. As described more fully below, the table relationship analyzer 230 can quantitatively, efficiently, and accurately analyze relationship between database tables 212.

The table relationship analyzer 230 can include a table vectorizer 232 configured to initially represent the database tables 212 as respective vectors in a multi-dimensional vector space. These vectors can be stored in a vector map 234 which can be accessed by other components (e.g., 244, 250, etc.), of the table relationship analyzer 230.

The table relationship analyzer 230 can also include a vector space modification engine 240 configured to modify the positions of the vectors in the multi-dimensional vector space. As shown, the vector space modification engine 240 can include a table linkage identifier 242, a vector adjuster 244, a step size modifier 246, a distance finder 248, a cluster engine 250, and an update manager 252.

The table linkage identifier 242 can be configured to receive an indication that two database tables 210 are related to each other. Clearly, two tables are related if a join operation involves both tables. Thus, in certain examples, table joins 220 can send indications to the table linkage identifier 242 that the joined tables are related to each other. In other examples, such as in the "cold start" situation when the database 210 is just set up and there is no usage data available for embedding the tables 212, the table linkage identifier 242 can use other information, such as foreign keys 222 and/or views 224, as indicators that certain tables are related to each other, as described more fully below.

In any of the examples described herein, a join operation can be an executed join statement in a running database environment or a join statement appearing in the codes of a database program. Based on executed join statements, the table relationship analyzer 230 can continuously analyze the relationship between database tables 212 according to their actual usage, thus tracking the dynamic status of the database 210. Based on join statements appeared in the codes, the table relationship analyzer 230 can predictively analyze the relationship between database tables 212, e.g., by determining and/or estimating how often such join statements would be executed.

In response to each indication that two tables 210 are related, the vector adjuster 244 can move the vectors accordingly in the multi-dimensional vector space. Specifically, as described more fully below, the vector adjuster 244 can be configured to move the vectors representing two related tables closer to each other whereas moving other vectors representing unrelated tables vectors farther away in the multi-dimensional vector space. As a result, after many iterations, tables that are closely related can be represented by respective vectors that are closely positioned in the multi-dimensional vector space, whereas tables that are unrelated can be represented by respective vectors that are spaced apart in the multi-dimensional vector space.

In certain examples, the step size of vector movement in the multi-dimensional vector space can be fixed. In other examples (and optionally), the step size of vector movement in the multi-dimensional vector space can be adaptive, e.g., based on distance between two vectors, as described further below. The step size of vector movement can be determined by the step size modifier 246.

The distance finder 248 can be configured to measure a distance between two vectors in the multi-dimensional vector space. Such distance measurement can be used by the vector adjuster 244 for vector movement, as well as by the step size modifier 246 to control the step size of vector movement.

The cluster engine 250 can be configured to group database tables 212 into one or more table clusters based on positions of their respective vectors in the multi-dimensional vector space. Such grouping can be based on distances between the vectors (e.g., measured by the distance finder 248) and/or other metrics, such as angles between the vectors.

The update manager 252 can be configured to manage how often (e.g., periodically, on-demand, continuously, etc.) to update the, and other update-related features.

The output of the table relationship analyzer 230 can be used in a number of applications. For example, a table placement manager 260 can be configured to distribute database tables 212 based on the grouping results of cluster engine 250. Specifically, database tables 212 contained in a table cluster can be placed in a common host machine by the table placement manager 260. In another example of supporting the table "proposal" feature noted above, in response to a query command involving a database table contained in a table cluster, a table recommender 270 can be configured to recommend a different database table from the table cluster. In yet another examples, many table analytics tools 280 can use the table clusters to identify semantically related database tables and use such information for more advanced data analytics (e.g., machine learning, pattern recognition, management decision support, etc.).

In practice, the systems shown herein, such as system 200 and its subsystems (e.g., 230), can vary in complexity, with additional functionality, more complex components, and the like. For example, there can be additional functionality within the table relationship analyzer 230. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 200 and any of the other systems and/or subsystems described herein can be implemented in conjunction with any of the hardware components described herein, such as the computing systems described below (e.g., processing units, memory, and the like). In any of the examples herein, the tables, vectors, vector map, distances, clusters, and the like can be stored in one or more computer-readable storage media or computer-readable storage devices. The technologies described herein can be generic to the specifics of operating systems or hardware and can be applied in any variety of environments to take advantage of the described features.

Figure 3:
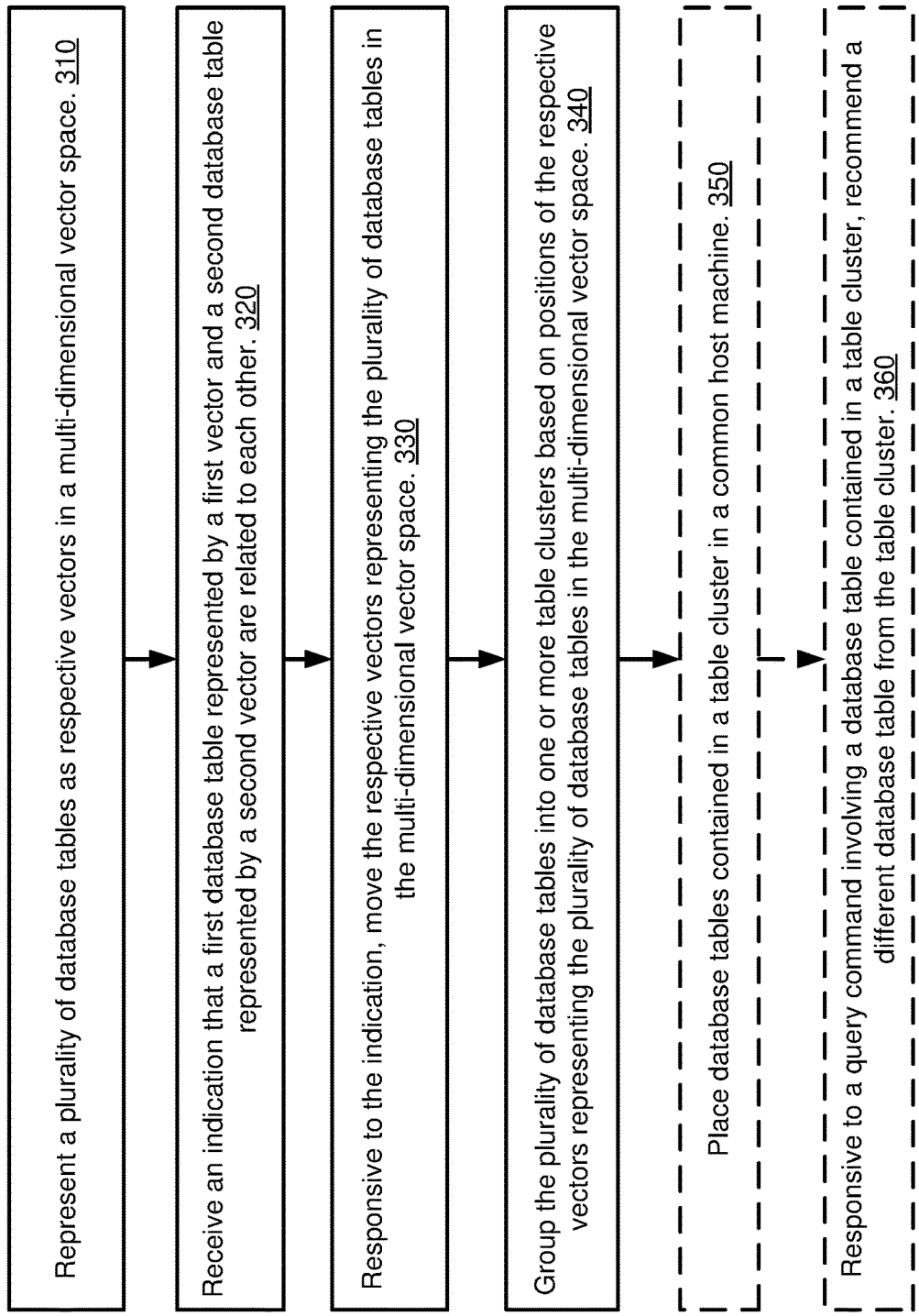
FIG. 3 is a flowchart illustrating an example overall method of analyzing table relationship using distance-based multi-dimensional representation of database tables.

Example 4—Example Overall Method for Relationship Analysis Using Vector Representation of Database Tables FIG. 3 is a flowchart of an example overall method 300 of implementing distance-based table relationship analysis based on multi-dimensional vector representation of database tables and can be performed, for example, by the system of FIG. 2.

At 310, the method 300 can represent or embed a plurality of database tables as respective vectors in a multi-dimensional vector space. This can be implemented, e.g., by the table vectorizer 232 and the resulting vectors can be stored in the vector map 234.

At 320, the method can receive an indication (e.g., via the table linkage identifier 242) that a first database table represented by a first vector and a second database table represented by a second vector are related to each other. As noted above and described further below, such indication can include a join operation between the first and second database tables, a foreign key relationship between the first and second database tables, and/or a view statement involving the first and second database tables.

At 330, responsive to the indication, the method 300 can move (e.g., via the vector adjuster 244) the respective vectors representing the plurality of database tables in the multi-dimensional vector space. As described further below, the act of moving the respective vectors representing the plurality of database tables in the multi-dimensional vector space can include moving the second vector closer to the first vector and moving vectors representing database tables other than the first and second database tables away from the first vector.

At 340, the method 300 can group (e.g., via the cluster engine 250) the plurality of database tables into one or more table clusters based on positions of the respective vectors representing the plurality of database tables in the multi-dimensional vector space. For example, distances and/or angles between the vectors can be calculated. Two or more database tables can be assigned to a table cluster if the distances and/or angles between respective vectors representing the two or more database tables are below a predefined threshold value. Any known or to be developed data clustering algorithms, whether they are supervised or unsupervised, can be used. In one particular example, the k-nearest neighbor algorithm can be used to group the database tables into table clusters.

Optionally, the method 300 can include additional steps based on the grouping results. For example, at 350, the method 300 can place database tables contained in a table cluster in a common host machine (e.g., via the table placement manager 260). As another example, at 360, responsive to a query command involving a database table contained in a table cluster, the method 300 can recommend a different database table from the table cluster (e.g., via the table recommender 270).

The method 300 and any of the other methods and algorithms described herein can be performed by computer-executable instructions (e.g., causing a computing system to perform the method) stored in one or more computer-readable media (e.g., storage or other tangible media) or stored in one or more computer-readable storage devices. Such methods and algorithms can be performed in software, firmware, hardware, or combinations thereof. Such methods and algorithms can be performed at least in part by a computing system (e.g., one or more computing devices).

The illustrated actions can be described from alternative perspectives while still implementing the technologies. For example, "receive" can also be described as "send" from a different perspective.

Example 5—Example Method for Vector Space Initialization

The table vectorizer 232 described above can be configured to perform vector space initialization. Specifically, tables in a database can be embedded in a multi-dimensional vector space as respective vectors. In one particular example, each table (T) in the database can be initially represented by a N-dimensional random vector, e.g., $V_T = [x_1, x_2, \ldots, x_N]$, where each element $(x_i)$ in the vector can be a random number.

The initially generated vectors for the database tables can be stored in a vector map (e.g., 234). The vector map can be configured to bidirectionally map database tables to respective vectors. For example, the vector map can be configured to include a plurality of key-value pairs, wherein a key corresponds to a database table and a value corresponds to a vector representing the database table. A lookup function can be implemented on the vector map so that given a database table, its corresponding vector can be retrieved instantly. Conversely, the lookup function can immediately return the corresponding database table given a vector representing such table.

The dimension (N) of the vector space can be predefined by a user of the database management system. In certain examples, N can be in the order about the square root of the number of database tables. In certain examples, N can range from tens to a few hundreds (e.g., N can be as low as 3-10, or as high as 100-500).

In certain examples, the predefined dimension of the vector space can be optimized by using a test set of tables where it is known that certain tables are similar and need to be grouped together. Thus, by running the table relationship analysis method described herein, the grouping results can be compared with the known similarity or grouping of the tables. Adjustment of the vector space dimension (e.g., increase or decrease N) can be made until the grouping results match or reflect the known similarity or grouping of the tables.

In certain examples, the initially defined vector space dimension may not be optimal as the database evolves. In such circumstances, the dimension of the vector space can be adjusted or reoptimized. In certain examples, when a new dimension is selected, the vectors can be regenerated in the new vector space (i.e., with changed dimension) by rerunning the table relationship analysis. In certain scenarios when reduction of the vector space dimension is needed, principle component analysis or other dimension reduction techniques can be used to reduce the dimension of the vector space without the need of rerunning the table relationship analysis.

Figure 4:
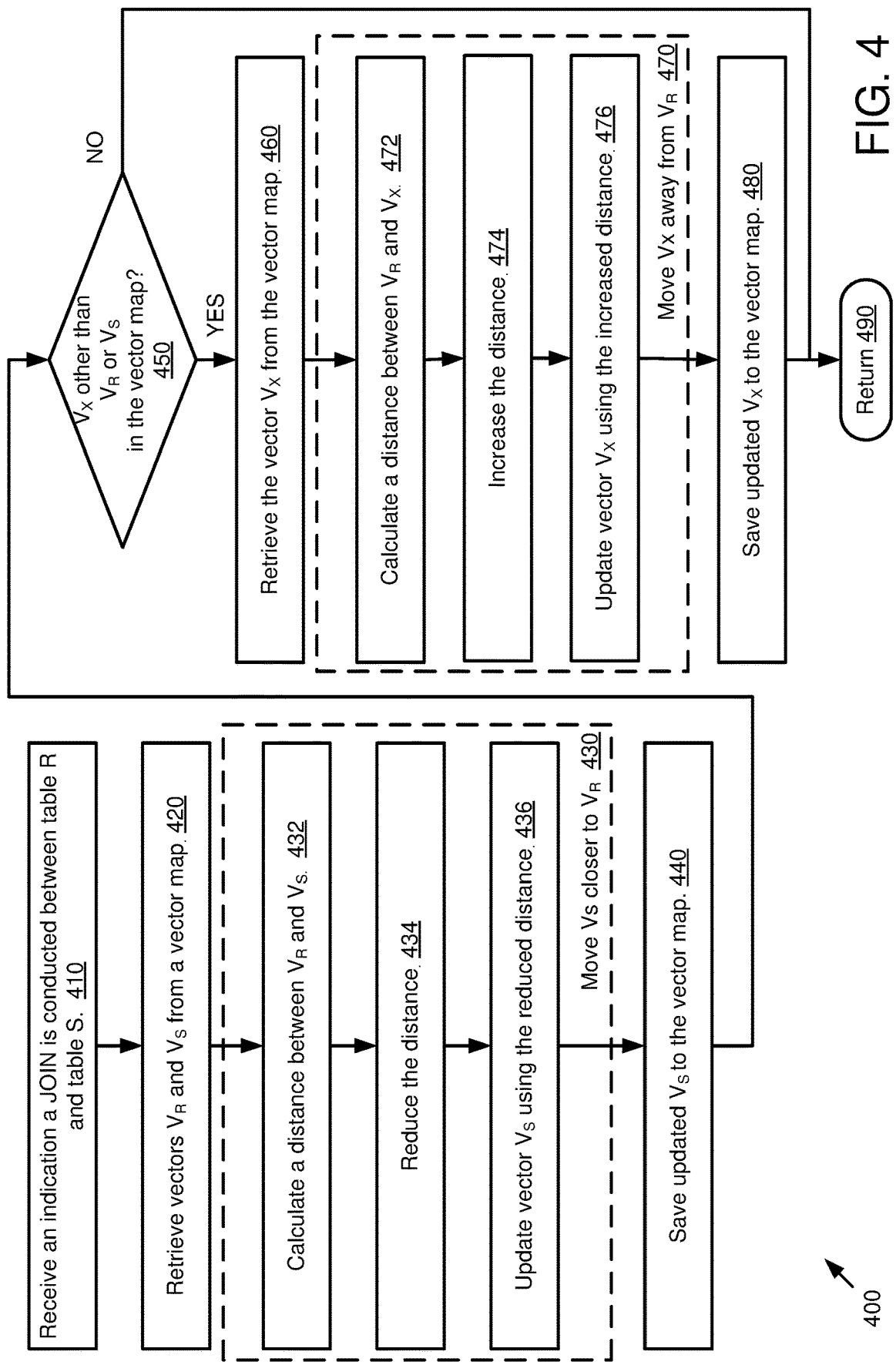
FIG. 4 is a flowchart illustrating an example algorithm for moving table vectors responsive to a table join operation.

Example 6—Example Algorithm for Moving Table Vectors Responsive to A Table Join Operation After the vector space is initialized, the vectors in the multi-dimensional space can be updated iteratively responsive to join operations between tables. As noted above, responsive to a join operation between two tables, the respective vectors representing the plurality of database tables can be moved in the multi-dimensional vector space. FIG. 4 shows a flowchart illustrating one example algorithm 400 for moving table vectors responsive to a table join operation. It is to be understood that variants of the algorithm 400 can be used for moving the table vectors based on the same principles described herein.

At 410, the algorithm 400 receives an indicator that a join operation is conducted between a first table denoted as R and a second table denoted as S. For example, table R can be the table immediately following "SELECT . . . FROM" and table S can be the table immediately following "JOIN" in a SQL join statement. In any of the examples herein, the join operation can be implemented by any type of SQL join statements, e.g., inner join, left join, right join, full join, etc.

At 420, the algorithm 400 can retrieve vectors representing tables R and S, respectively denoted as $Y_R$ and $V_S$, from a vector map (e.g., 234).

Then at 430, the algorithm 400 can move the vector $V_S$ closer to $V_R$. As shown, such move can include three sub-steps: At 432, a distance D R s between the two vectors $V_R$ and $V_S$ can be calculated, i.e., $D_{RS} = V_R - V_S$. At 434, the distance can be multiplied by an approaching factor α which is smaller than 1 so as to derive a reduced distance $D_{RS}'$, i.e., $D_{RS}' = \alpha * D_{RS}$. Then at 436, the vector $V_S$ can be updated (denoted as $V_S'$) using the reduced distance, i.e., $V_S' = V_R + D_{RS}'$.

In any of the examples herein, the distance between two vectors can be measured using a variety of metrics. For example, the distance between two vectors can be measured by using Euclidean distance, or Manhattan distance, or Minkowski distance, or any other distance metrics.

At 440, the updated $V_S$ can be saved to the vector map (i.e., $V_S$ in the vector map is replaced by $V_S'$).

At 450, a condition check can be performed to determine if there is any vector (denoted as $V_X$ representing a table X) in the vector map that is other than $V_R$ or $V_S$. If no such vector is found, then the algorithm 400 can return at 490. Otherwise, the following steps can be performed.

At 460, the algorithm 400 can retrieve the vector $V_X$ from the vector map.

At 470, the vector $V_X$ can be moved away from $V_R$. As shown, such move can include three sub-steps: At 472, a distance $D_{RX}$ between the two vectors $V_R$ and $V_X$ can be calculated, i.e., $D_{RX} = V_R - V_X$. At 474, the distance can be multiplied by a distancing factor β which is greater than 1 so as to derive an increased distance $D_{RX}'$, i.e., $D_{RX}' = \beta * D_{RX}$. Then at 476, the vector $V_X$ can be updated (denoted as $V_X'$) using the increased distance, i.e., $V_X' = V_R + D_{RX}'$.

At 480, the updated $V_X$ can be saved to the vector map (i.e., $V_X$ in the vector map is replaced by $V_X'$).

Thus, according to the algorithm 400, responsive to each join operation between two tables (e.g., R and S), the vectors representing these two tables (e.g., $V_R$ and $V_S$) are moved closer, whereas vectors representing all other tables (e.g., $V_X$) are moved farther away (e.g., from $V_R$). If the join operation between these two tables (e.g., R and S) is repeated many times, the vectors representing these two tables (e.g., $V_R$ and $V_S$) can progressively converge in the multi-dimensional vector space. In addition, these two vectors (e.g., $V_R$ and $V_S$) can also be separated farther away from vectors representing other tables (e.g., $V_X$) that are unrelated to these two tables.

In circumstances where another table (e.g., X) is indirectly related to table R or S (e.g., via one or more hops of intermediary tables), the vector representing such table (e.g., $V_X$) can also effectively move closer to $Y_R$ and $V_S$ through those intermediary table relationships. For example, assume there are a number of join operations between table R and table S. Further assume there are a number of join operations between table S and table T as well as a number of join operations between table T and table X. In other words, table X is not directed related to either table R or table S. Instead, it is indirectly related to table S via the intermediary table T. Running the algorithm 400 described above after each of the join operations can cause vector $V_S$ (representing table S) to converge toward vector $Y_R$ (representing table R), vector $V_T$ (representing table T) to converge toward vector $V_S$, and vector $V_X$ (representing table X) to converge toward vector $V_T$. As a result, the net outcome is that vector $V_X$ can be effectively moved closer to vectors $V_S$ and $Y_R$ through the movement of vector $V_T$.

Example 7—Example Method for Dynamically Adjusting Step Size for Table Vector Movement As described above, the step size of moving a vector toward or away from another vector can depend on a distance between the two vectors (e.g., $D_{RS}$ or $D_{RX}$) and a coefficient (e.g., the approaching factor α or the distancing factor (3). In certain examples, the step size of vector movement in the multi-dimensional vector space can be dynamically adjusted (e.g., by the step size modifier 246) based on the measured between two vectors.

For example, as described above, the approaching factor α is less than 1 so as to ensure when moving one vector (e.g., $V_S$) toward another vector (e.g., $V_R$), their distance (e.g., $D_{RS}$) becomes smaller. In certain examples, the approaching factor α can be a predefined constant, e.g., 0.9, 0.85, 0.8, 0.75, 0.7, 0.6, 0.5, or any other value that is between 0 and 1. Optionally, the approaching factor α can be dynamically adjusted (e.g., by the step size modifier 246) so that vectors that are farther apart can approach each other faster than vectors that are already close together. In one example, this can be achieved by calculating the approaching factor α as an exponential function of the distance (x) between two vectors, e.g., α=exp(−x), where exp( ) denotes an exponential function. Thus, when the distance approaches 0 (i.e., the two vectors become nearly identical), the approaching factor α approaches 1. As a result, the reduction of distance between the two vectors becomes negligible. Conversely, when the distance approaches infinity, the approaching factor α approaches 0. As a result, the distance between the two vectors can be reduced to close to 0 (i.e., the two vectors can be immediately brought to a close proximity). Although a particular exponential function is described above as an example, it is to be understood that dynamic adjustment of the approaching factor α can be implemented by other functions based on the same principles described herein. In addition, the function can be truncated so that the approaching factor α will not drop below a lower limit (e.g., 0.001) instead of being zero and/or rise above a higher limit (e.g., 100) instead of approaching infinity.

In another example, as described above, the distancing factor β is greater than 1 so as to ensure when moving one vector (e.g., $V_X$) away from another vector (e.g., V R), their distance (e.g., $D_{RX}$) becomes larger. In certain examples, the distancing factor β can be a predefined constant, e.g., 1.1, 1.2, 1.5, 2.0, 2.5, or any other value that is greater than 1. Optionally, the distancing factor β can be dynamically adjusted (e.g., by the step size modifier 246) so that vectors that are close together are separated by a greater distance than vectors that are already farther apart. In one example, this can be achieved by calculating the distancing factor β as an exponential function of the distance (x) between two vectors, e.g., β=1/x+1. Thus, when the distance approaches infinity (i.e., the two vectors are already separated far apart), the distancing factor β approaches 1. As a result, there is little change to the distance between the two vectors (i.e., no need to further separate the two vectors). Conversely, when the distance approaches 0 (i.e., the two vectors are close to each other), the distancing factor β approaches infinity. As a result, there can be a sharp increase of the distance between the two vectors. Although a particular exponential function is described above as an example, it is to be understood that dynamic adjustment of the distancing factor β can be implemented by other functions based on the same principles described herein. In addition, the function can be truncated so that the distancing factor β will not drop below a lower limit (e.g., 1.001) instead of being 1.0 and/or rise above a higher limit (e.g., 100) instead of approaching infinity.

Example 8—Example Use Case Illustrating Movement of Table Vectors Responsive to Table Join Operations FIGS. 5-13 show multiple states of vector representation of database tables in an example use case to further illustrate the algorithm 400.

In this example use case, a database includes the following five tables: (1) Business Partner (BP), (2) Business Partner Relationship (BPR), (3) Product (P), (4) Customer Order (CO), and (5) Material M). In addition, the following four join operations are considered: (1) BP joins BPM; (2) CO joins P; (3) P joins M; and (4) BP joins CO.

Only a small number of tables and join operations are illustrated in this use case for simplicity, although it should be understood there can be many thousands or even millions of tables and/or join operations. In addition, for better visualization purposes, the dimension of the vector space is set to 2, although it is to be understood that the dimension of the vector space can be set to any positive integer. Further, for simplicity, the approaching factor α is set to a constant value 0.5 and the distancing factor β is set to another constant value 1.5, although it is to be understood that a can be set to any value between 0 and 1 and β can be set to any value that is greater than 1, or alternatively, a and/or β can be dynamically adjusted as described above.

Figure 5:
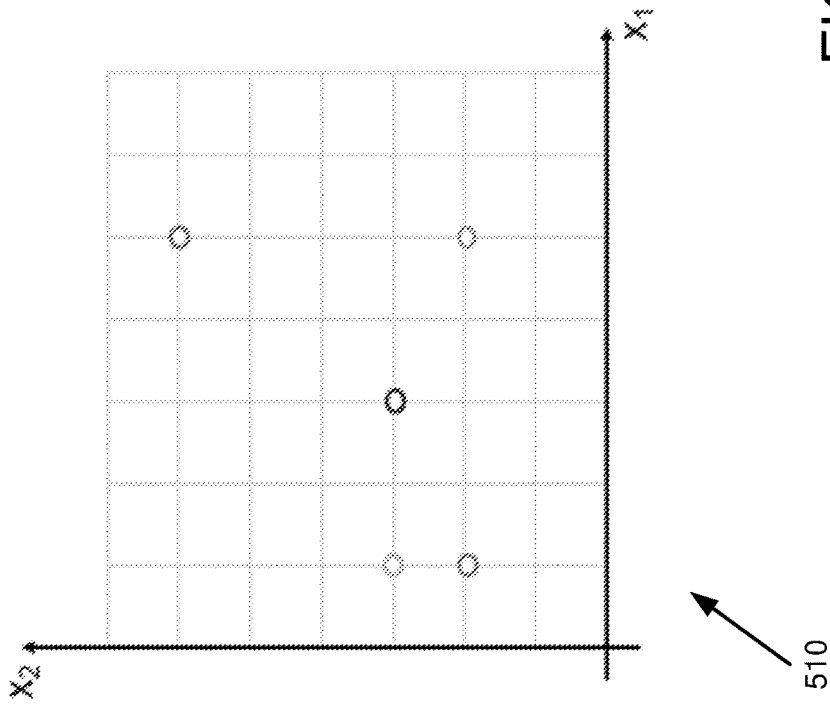
FIG. 5 depicts an initial state of vector representation of database tables in an example use case.

FIG. 5 shows an initial state of vector representation of the five example tables. The left panel 500 lists the five tables and the initial elements of vectors representing the respective tables. As noted above, the initial elements of the vectors can be randomly generated. The right panel 510 displays the positions of the five initial vectors corresponding to the five tables in the two-dimensional vector space. The two dimensions are represented by x1 and x2, respectively. The displayed grid has a unit length in both x1 and x2 axes. The elements in a vector correspond to (x1, x2)

coordinates of the vector that define the its position in the two-dimensional vector space. For example, the five vectors corresponding to the five tables (i.e., BP, BPR, P, CO, and M) are respectively denoted as $V_{BP}$, $V_{BPR}$, $V_P$, $V_{CO}$, and $V_M$, and their coordinates are (3, 3), (5, 6), (5, 2), (1, 2), and (1, 3), respectively.

Figure 6:
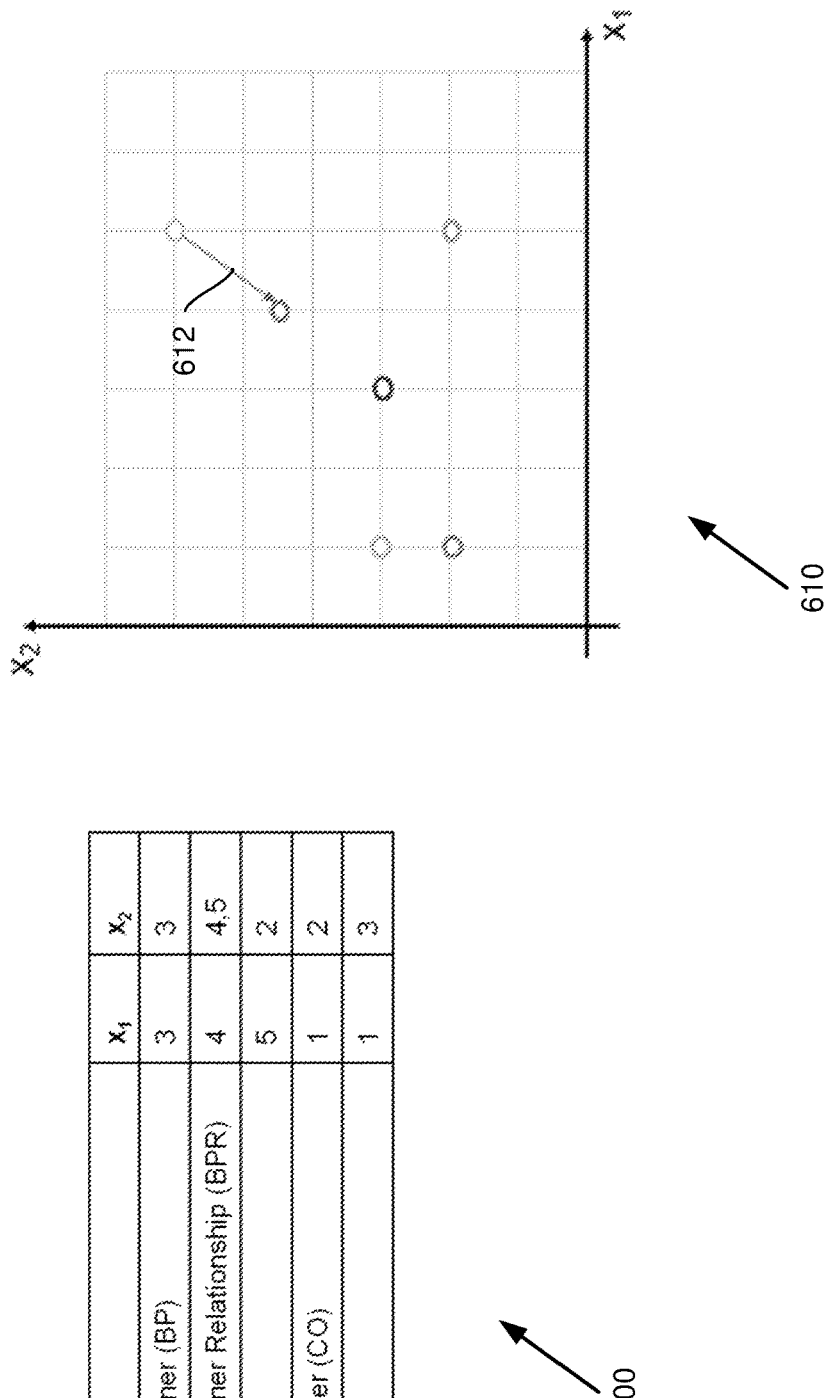
FIG. 6 depicts movement of one vector responsive to a first join operation in the example use case of FIG. 5.

FIG. 6 shows an example vector movement responsive to the first join operation (i.e., BP joins BPR). The left panel 600 shows the coordinates of the five vectors (i.e., $V_{BP}$, $V_{BPR}$, $V_P$, $V_{CO}$, and $V_M$) respectively representing the five tables, and the right panel 610 shows the positions of the five vectors in the two-dimensional vector space. In the depicted state, the vector $V_{BPR}$ moves closer to $V_{BP}$ according to step 430. Specifically, according to step 432, the distance (D) between $V_{BPR}$ and $V_{BP}$ is calculated as $D=V_{BPR}-V_{BP}=(5, 6)-(3, 3)=(2, 3)$. Next, according to step 434, the distance is updated to $D'=\alpha*D=0.5*(2, 3)=(1, 1.5)$. Then, according to 436, the vector $V_{BPR}$ is updated as $V_{BPR}=V_{BP} D'=(3, 3)+(1, 1.5)=(4, 4.5)$. Thus, the net effect is moving $V_{BPR}$ from (5, 6) to (4, 4.5), as indicated by the arrow 612.

Figure 7:
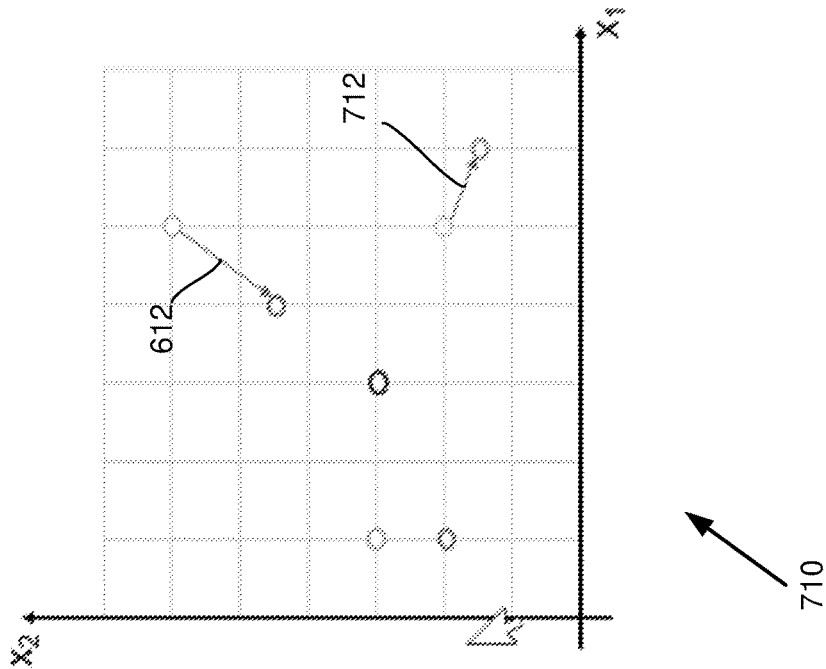
FIG. 7 depicts another vector movement responsive to the first join operation in the example use case of FIG. 5.

FIG. 7 shows another vector movement responsive to the first join operation (i.e., BP joins BPR). The left panel 700 shows the coordinates of the five vectors and the right panel 710 shows the positions of the five vectors in the two-dimensional vector space. In the depicted state, the vector $V_P$ moves away from $V_{BP}$ according to step 470. Specifically, according to step 472, the distance (D) between $V_P$ and $V_{BP}$ is calculated as $D=V_P-V_{BP}=(5, 2)-(3, 3)=(2, -1)$. Next, according to step 474, the distance is updated to $D'=(3*D=1.5*(2, -1)=(3, -1.5)$. Then, according to step 476, the vector $V_P$ is updated as $V_P=V_{BP} D'=(3, 3)+(3, -1.5)=(6, 1.5)$. Thus, the net effect is moving $V_P$ from (5, 2) to (6, 1.5), as indicated by the arrow 712.

Figure 8:
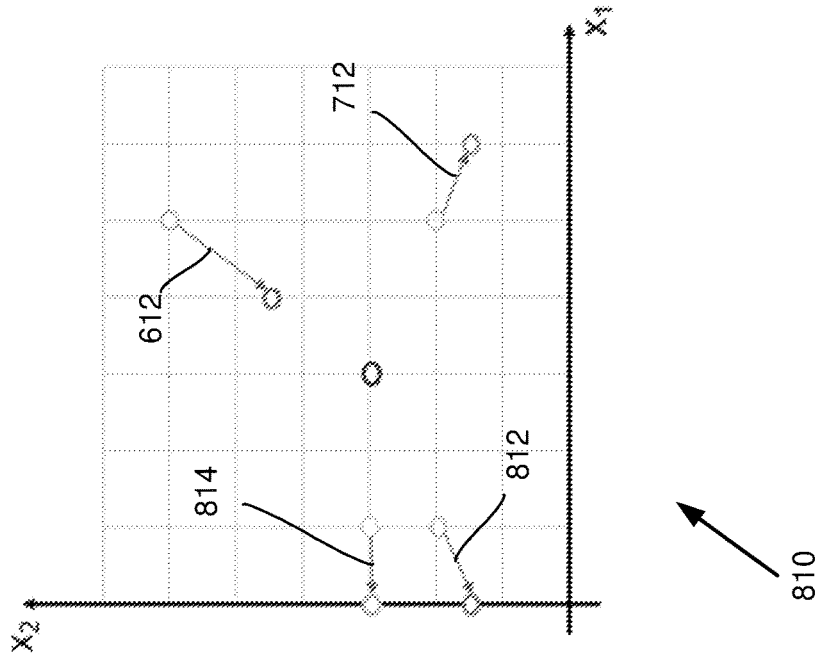
FIG. 8 depicts additional vector movement responsive to the first join operation in the example use case of FIG. 5.

FIG. 8 shows additional vector movement responsive to the first join operation (i.e., BP joins BPR). The left panel 800 shows the coordinates of the five vectors and the right panel 810 shows the positions of the five vectors in the vector space. In the depicted state, both vectors $V_{CO}$ and $V_M$ move away from $V_{BP}$ according to step 470. Based on similar calculations as descried above, the net effect is moving $V_{CO}$ from (1, 2) to (0, 1.5), as indicated by the arrow 812, and moving $V_M$ from (1, 3) to (0, 3), as indicated by the arrow 814.

Figure 9:
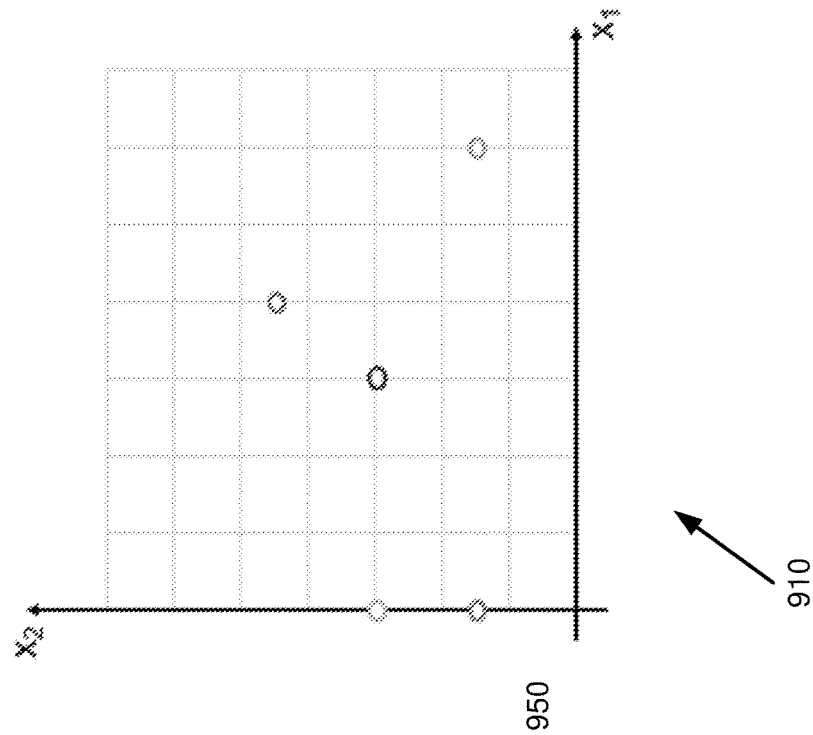
FIG. 9 depicts another state of vector representation of database tables responsive to the first join operation in the example use case of FIG. 5.

FIG. 9 shows the final vector coordinates of the five vectors (see 900) and their positions in the two-dimensional vector space (see 910) responsive to the first join operation (i.e., BP joins BPR). Compared to the initial state depicted in FIG. 5, it can be seen that the net effect of the above calculations is $V_{BPR}$ moves closer to $V_{BP}$ while $V_P$, $V_{CO}$ and $V_M$ all move away from $V_{BP}$ (note that the position of $V_{BP}$ remains changed).

Figure 10:
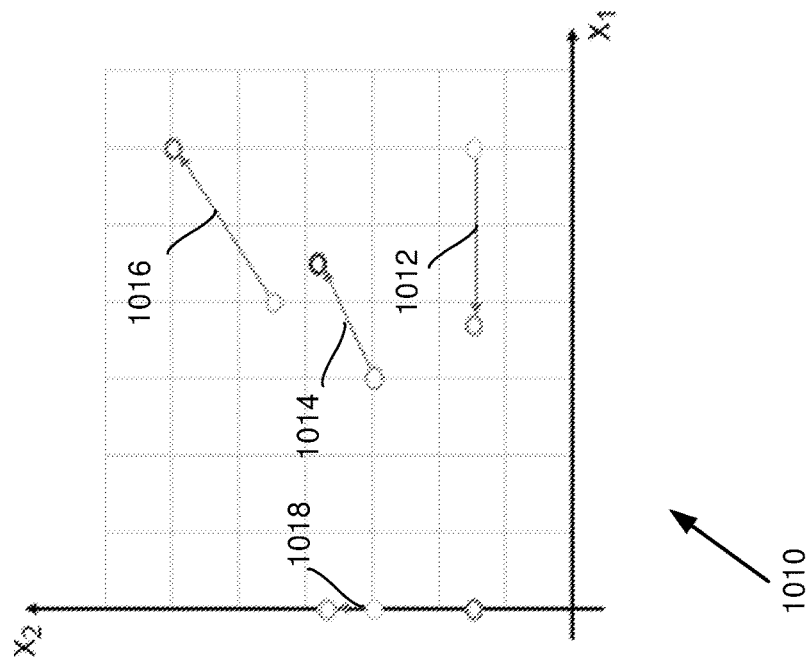
FIG. 10 depicts additional vector movement responsive to a second join operation in the example use case of FIG. 5.

FIG. 10 depicts the movement of the five vectors (see 1010) in the two-dimensional vector space and their final coordinates (see 1000) responsive to the second join operation (i.e., CO joins P). Based on similar calculations as descried above, the vector $V_P$ moves from (6, 1.5) to (3.75, 1.5), as indicated by the arrow 1012. The vector $V_{BP}$ moves from (3, 3) to (4.5, 3.75), as indicated by the arrow 1014. The vector $V_{BPR}$ moves from (4, 4.5) to (6, 6), as indicated by the arrow 1016. In addition, the vector $V_M$ moves from (0, 3) to (0, 3.75), as indicated by the arrow 1018. Compared to the state depicted in FIG. 9, it can be seen that the net effect of the above vector movement is that vector $V_P$ moves closer to $V_{CO}$ (according to step 430), whereas the other three vectors $V_{BP}$, $V_{BPR}$, and $V_M$ all move away from $V_{CO}$ (according to step 470).

Figure 11:
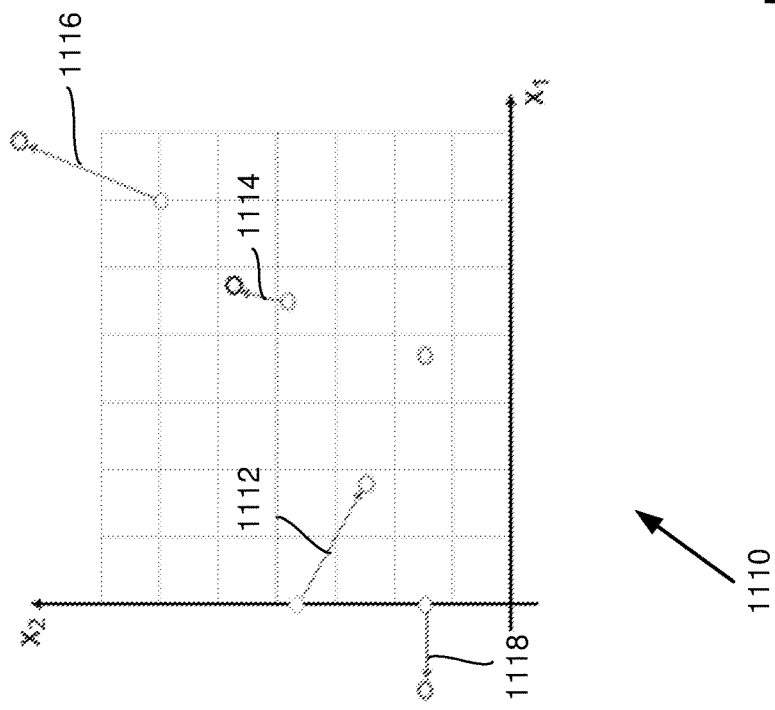
FIG. 11 depicts additional vector movement responsive to a third join operation in the example use case of FIG. 5.

FIG. 11 depicts the movement of the five vectors (see 1110) in the two-dimensional vector space and their final coordinates (see 1100) responsive to the third join operation (i.e., P joins M). Based on similar calculations as descried above, the vector $V_M$ moves from (0, 3.75) to (1.875, 2.65), as indicated by the arrow 1112. The vector $V_{BP}$ moves from (4.5, 3.75) to (4.875, 4.875), as indicated by the arrow 1014. The vector $V_{BPR}$ moves from (6, 6) to (7.125, 8.25), as indicated by the arrow 1116. In addition, the vector $V_{CO}$ moves from (0, 1.5) to (-1.875, 1.5), as indicated by the arrow 1118. Compared to the state depicted in FIG. 10, it can be seen that the net effect of the above vector movement is that vector $V_M$ moves closer to $V_P$ (according to step 430), whereas the other three vectors $V_{BP}$, $V_{BPR}$, and $V_{CO}$ all move away from $V_P$ (according to step 470).

Figure 12:
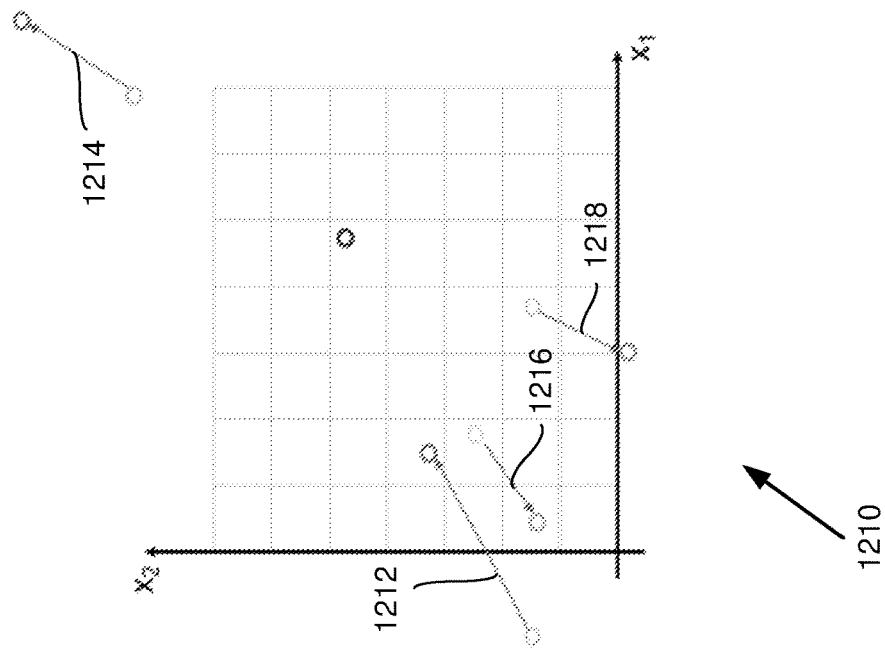
FIG. 12 depicts additional vector movement responsive to a fourth join operation in the example use case of FIG. 5.

FIG. 12 depicts the movement of the five vectors (see 1210) in the two-dimensional vector space and their final coordinates (see 1200) responsive to the fourth join operation (i.e., BP joins CO). Based on similar calculations as descried above, the vector $V_{CO}$ moves from (-1.875, 1.5) to (1.5, 3.1875), as indicated by the arrow 1212. The vector $V_{BPR}$ moves from (7.125, 8.25) to (8.25, 9.9375), as indicated by the arrow 1214. The vector $V_M$ moves from (1.875, 2.65) to (0.375, 1.5375), as indicated by the arrow 1216. In addition, the vector $V_P$ moves from (3.75, 1.5) to (3.1875, -0.1875), as indicated by the arrow 1218. Compared to the state depicted in FIG. 11, it can be seen that the net effect of the above vector movement is that vector $V_{CO}$ moves closer to $V_{BP}$ (according to step 430), whereas the other three vectors $V_{BPR}$, $V_M$, and $V_P$ all move away from $V_{BP}$ (according to step 470).

Figure 13:
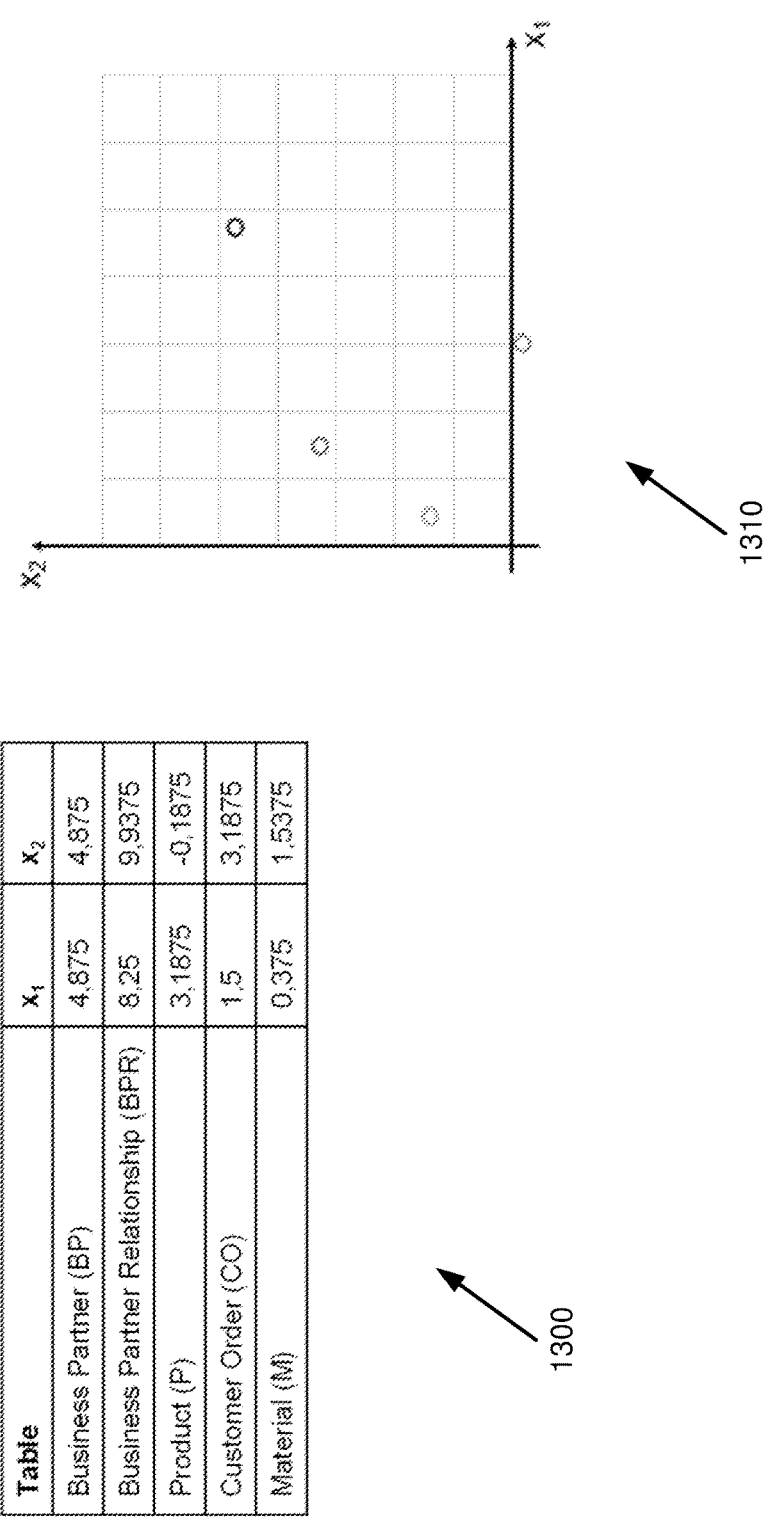
FIG. 13 depicts a final state of vector representation of database tables responsive to four join operations in the example use case of FIG. 5.

FIG. 13 depicts the final state of vector representation of the five database tables responsive to the above four join operations. The final coordinates of the tables are shown in 1300, and the final positions of the vectors are shown in 1310. Compared to the initial state depicted in FIG. 5, it can be seen that the net effect of vector movement described above can cause the following structure in the vector space: (a) The vector $V_{BPR}$ moves farther away from vectors $V_P$, $V_M$, and $V_{CO}$ (because BPR is not used in join operation with any of the tables P, M, or CO); (b) The vector that is closest to vector $V_{BPR}$ is $V_{BP}$ (because of the first join operation between tables BP and BPR); (c) The vector $V_{CO}$ moves closer to $V_P$ (because of the second join operation between tables CO and P); (d) The vector $V_P$ moves closer to $V_M$ (because of the third join operation between tables P and M); and (e) The vector $V_{CO}$ moves in between vectors $V_P$, $V_M$, and $V_{BP}$ (because of the second operation between tables CO and P, the fourth join operation between tables CO and BP, and the third join operation between tables P and M). Clearly, if the join operations described above are repeated, then the corresponding vector movement can further enhance the above structure (e.g., the vector $V_{BPR}$ is separated from the cluster of vectors $V_{CO}$, $V_P$, and $V_M$).

Example 9—Example Method for Updating Vector Space

As described herein, after initialization of the vector space (e.g., by the table vectorizer 232), vectors representing database tables in a database can be continuously updated (e.g., by the vector adjuster 244) using the algorithm 400 described above. For example, after each new join operation between two tables, the vector space can be intuitively and directly updated in real-time, by following similar procedure as illustrated in FIGS. 5-13.

In alternative examples, update of the vector space can be performed in batch mode. For example, the update of the vector space can be performed periodically (e.g., every night, etc.) and/or on-demand (e.g., upon receiving a user's command) based on collected usage statistics (e.g., a collection of join operations executed since the previous update of the vector space). How frequent to update the vector space can be defined by a configuration file, which can be stored in an update manager (e.g., 252).

In any of the examples described herein, calculation of vector movement in the multi-dimensional vector space can be parallelized based on multi-core processing involving multiple threads that can run simultaneously. For example, in certain examples, each vector movement can be allocated to a selected thread in such multi-thread computing environment to improve the system performance (e.g., to balance the work load between multiple processors and improve the efficiency/speed of updating the vector space).

Example 10—Example Method for Cold Start Calculation

When users first set up their database (e.g., they just bought a default data model, executed the CREATE and INSERT statements on their desired database), there is no usage data available to embed the database tables (e.g., no join operation between two tables has been executed). In such "cold start" circumstances, using randomized vectors to initialize the table vectors may not accurately reflect the relationship between the underlying tables, although the embedding may gradually become more accurate after a certain period of usage of the database (e.g., after executing a number of join operations).

In any of the examples described herein, the "cold start" problem can be mitigated by using non-usage information (i.e., not based on executed join operations), such as foreign keys 222 and/or views 224, as indicators that certain tables are related to each other.

In certain examples, for every foreign key relationship that links two database tables, it can be assumed that a plurality number (denoted as $\gamma$) of join operations between the two tables are performed. In other words, the process described in 400 can be repeated for $\gamma$ iterations. Using the examples described above, if the tables BP and BPR are connected through a foreign key, it can be treated as if the join operation between BP and BPR has been executed $\gamma$ times in a row. The parameter $\gamma$ can be a predefined integer, which can be set according to the size of the database or heuristically. For example, the parameter $\gamma$ can range from about 5 to about 20 in some cases, or range from about 10 to about 50 in some cases, or range from about 20 to about 100 in some cases, and the like.

In certain examples, for every view statement involving two database tables, it can be assumed that a plurality number (denoted as $\delta$) of join operations between the two tables are performed. In other words, the process described in 400 can be repeated for $\delta$ iterations. In other words, the view can be treated as if the join operation between the two tables involved in the view statement has been executed $\delta$ times in a row. Similarly, the parameter $\delta$ can be a predefined integer, which can be set according to the size of the database or heuristically. In certain examples, the parameter $\delta$ can be set so that $\delta > \gamma$. In other words, more emphasis or weight can be given to the view statement than the foreign keys (i.e., a view statement involving two database tables indicates a closer table association/relationship than a foreign key relationship between two database tables).

Thus, by using foreign key relationship and/or view statements as surrogates of executed join operations, the method described herein can achieve an initial embedding of database tables that is close to the intended usage of these tables, and is more accurate than total random initialization of the vector space.

Example 11—Example Advantages

A number of advantages can be achieved via the technology described herein.

As noted above, some conventional techniques for measuring distances between database tables require the construction of a matrix which measures statistical relationship between all possible pairs of database tables. For example, each element in the matrix can measure a statistical relationship between two tables, such as a count of join operations performed in a period of time that involve two tables. The relationship matrix needs to be re-evaluated when a table is added to or deleted from the database. For a database including M database tables, such relationship matrix has M rows and M columns. Thus, the data contained in the relationship matrix grows exponentially when M is increased. As a result, such conventional approaches not only cost valuable memory space to such a large relationship matrix, but also are associated with higher computational cost to update the relationship matrix. As M becomes very large, updating the relationship matrix frequently (e.g., each time a table is added to or deleted from the database) becomes too computationally expensive to be technically feasible.

In contrast, the technology described herein can measure the distances between database tables using an M-by-N vector matrix, where M is the number of tables in the database, and N is the dimension of the vector space for embedding the tables. Because N is a fixed constant, change of the database by adding or deleting tables will only cause change of one dimension of the vector matrix (e.g., addition or deletion of a corresponding row or column). Thus, the data contained in the vector matrix grows linearly when M is increased (in contrast to the exponential growth in relationship matrix). Accordingly, when M is very large, the technology described herein requires a much smaller memory space to store the vector matrix than the relationship matrix. In addition, updating the vector space, e.g., according to the algorithm 400, requires simple calculations. Thus, frequent, or even real-time update of the vector matrix becomes feasible. In other words, the vector matrix can always be up to date in reflecting the database status because the vectors changes (minimally) after every database operation and the vector space can adapt to the database usage and accurately reflect changes in database usage patterns.

Further, the technology described herein is more advantageous than conventional techniques in measuring distances (and/or similarity) between tables that have indirect relationship (i.e., when the tables are indirectly joined using one or more intermediary tables). This can be illustrated in FIG. 14, where left panel shows a relationship matrix 1400 involving three tables R, S, and T, and the right panel shows a vector matrix 1410 involving the same three tables embedded in a three-dimensional vector space spanned by axes x1, x2, and x3.

As indicated in the relationship matrix 1400, there is no join operation between tables R and S. Thus, in order to accurately measure the distance between R and S, other tables (e.g., T) must be considered. For example, there are 4 join operations between tables R and T and 5 join operations between tables S and T. As such, tables R and S are indirectly joined via the intermediary table T. The distance between tables R and S is affected by the distance between R and T and the distance between S and T. There may be other intermediary table between tables R and S. Thus, based on the relationship matrix 1400, it can be computationally challenging and require complicated algorithm in order to accurately measure the distance between two tables while taking into consideration of all intermediary tables.

In contrast, using the vector matrix 1410, distances between two vectors can be immediately calculated based on simple vector arithmetic. For example, the distance between table R and S can be measured by subtracting the vector representing table S, i.e., (0.5, 1.5, 0) from the vector representing table R, i.e., (1.5, 0.9, 0.2). As described above, the technology described herein can cause vectors representing indirectly joined tables to converge in the vector space. In fact, the indirect join relationship between two tables is inherently embedded in the vector space via the vector movement corresponding to their intermediary tables. Thus, the distance (or similarity) between indirectly related tables can be directly and efficiently calculated based on the vector matrix 1410. Moreover, as noted above, even for tables that are not joined directly, their distance can be measured easily via foreign keys and/or views.

The technology described herein has broad applications. For example, the technology described herein can be used to create an efficient and optimal table placement plan for distributing and/or redistributing tables among a plurality of nodes. In addition, the disclosed technology can be used to reveal hidden or obscure relationship between database tables and generate insights into the database. It can help enterprises to better understand the usage and the semantics of the tables within their database system, thus facilitating their decision-making process. Moreover, the technology described herein can be very helpful in integration projects where databases from difference sources need to be integrated and relationships between tables need to be updated. Further, the disclosed technology can be incorporated in database tools, e.g., to implement a smart table "proposal" feature which can hint or recommend a user what table(s) to be included in a SQL statement.

Example 12—Example Computing Systems

Figure 15:
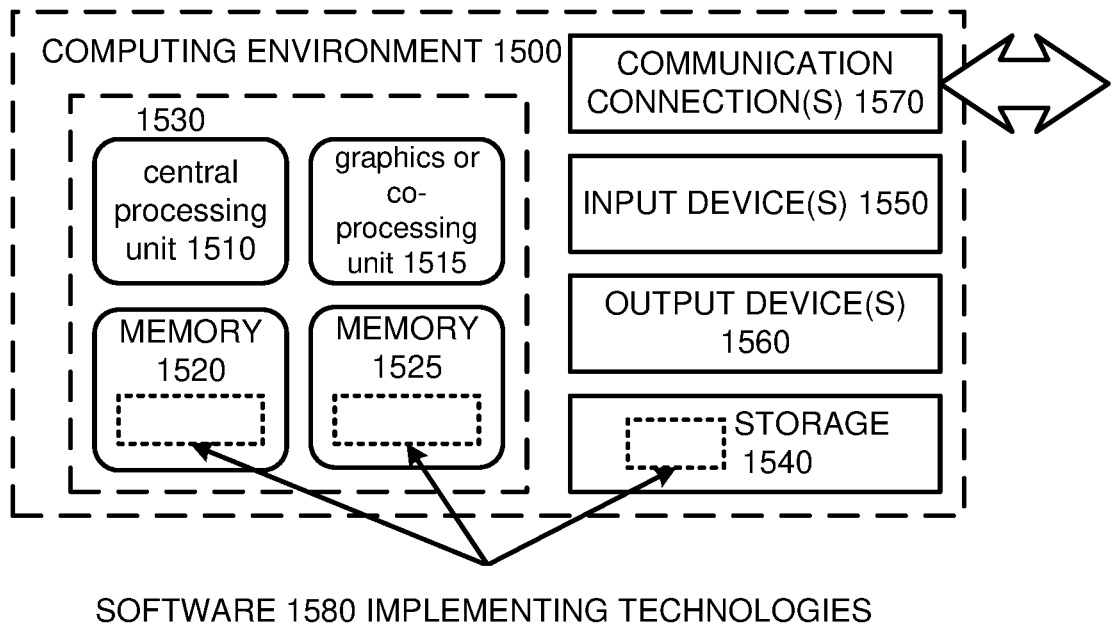
FIG. 15 is a block diagram of an example computing system in which described embodiments can be implemented.

FIG. 15 depicts an example of a suitable computing system 1500 in which the described innovations can be implemented. The computing system 1500 is not intended to suggest any limitation as to scope of use or functionality of the present disclosure, as the innovations can be implemented in diverse computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 can be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 can have additional features. For example, the computing system 1500 includes storage 1540, one or more input devices 1550, one or more output devices 1560, and one or more communication connections 1570, including input devices, output devices, and communication connections for interacting with a user. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 can be removable or non-removable, and includes magnetic disks, magnetic tapes or cassettes, CD-ROMs, DVDs, or any other medium which can be used to store information in a non-transitory way and which can be accessed within the computing system 1500. The storage 1540 can store instructions for the software implementing one or more innovations (e.g., 300 and/or 400) described herein.

The input device(s) 1550 can be an input device such as a keyboard, mouse, pen, or trackball, a voice input device, a scanning device, touch device (e.g., touchpad, display, or the like) or another device that provides input to the computing system 1500. The output device(s) 1560 can be a display, printer, speaker, CD-writer, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 13—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 14—Example Cloud Computing Environment

Figure 16:
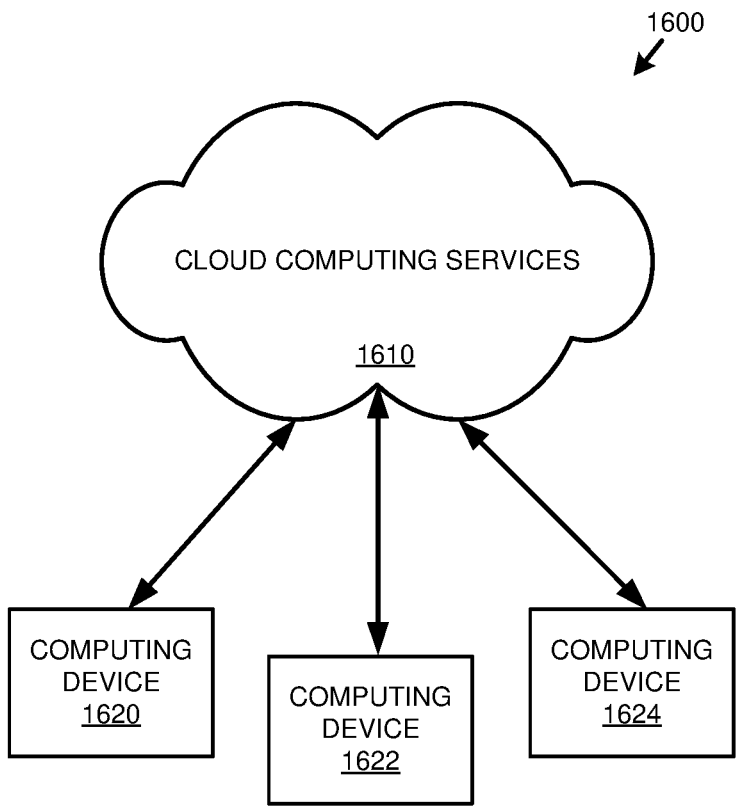
FIG. 16 is a block diagram of an example cloud computing environment that can be used in conjunction with the technologies described herein.

FIG. 16 depicts an example cloud computing environment 1600 in which the described technologies can be implemented, including, e.g., the system disclosed above and other systems herein. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1623. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operations (e.g., data processing, data storage, and the like).

In practice, cloud-based, on-premises-based, or hybrid scenarios can be supported.

Example 15—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this disclosure and in the claims, the singular forms "a," "an," and "the" include the plural forms unless the context clearly dictates otherwise. Additionally, the term "includes" means "comprises." Further, "and/or" means "and" or "or," as well as "and" and "or."

Example 16—Example Embodiments

Any of the following embodiments can be implemented.

Clause 1. A computer-implemented method comprising: representing a plurality of database tables as respective vectors in a multi-dimensional vector space; receiving an indication that a first database table represented by a first vector and a second database table represented by a second vector are related to each other; responsive to the indication, moving positions of the respective vectors representing the plurality of database tables in the multi-dimensional vector space; and grouping the plurality of database tables into one or more table clusters based on the positions of the respective vectors representing the plurality of database tables in the multi-dimensional vector space.

Clause 2. The method of clause 1, further comprising placing database tables contained in a table cluster in a common host machine.

Clause 3. The method of any one of clauses 1-2, further comprising: responsive to a query command involving a database table contained in a table cluster, recommending a different database table from the table cluster.

Clause 4. The method of any one of clauses 1-3, wherein moving positions of the respective vectors representing the plurality of database tables in the multi-dimensional vector space comprises moving the second vector closer to the first vector.

Clause 5. The method of clause 4, wherein moving the second vector closer to the first vector comprises reducing a distance between the first vector and the second vector by a decrement size, wherein the decrement size progressively decreases when the distance between the first vector and the second vector decreases.

Clause 6. The method of any one of clauses 1-5, wherein moving positions of the respective vectors representing the plurality of database tables in the multi-dimensional vector space comprises moving a third vector representing a third database table other than the first and second database tables away from the first vector.

Clause 7. The method of clause 6, wherein moving the third vector away from the first vector comprises increasing a distance between the first vector and the third vector by an increment size, wherein the increment size progressively decreases when the distance between the first vector and the third vector increases.

Clause 8. The method of any one of clauses 1-7, wherein the indication comprises a join operation between the first database table and the second database table.

Clause 9. The method of any one of clauses 1-8, wherein the indication comprises a foreign key relationship between the first database table and the second database table or a view statement involving the first database table and the second database table.

Clause 10. The method of any one of clauses 1-9, wherein grouping the plurality of database tables comprises measuring distances or angles between respective vectors representing the plurality of database tables in the multi-dimensional vector space.

Clause 11. A computing system comprising: memory; one or more hardware processors coupled to the memory; and one or more computer readable storage media storing instructions that, when loaded into the memory, cause the one or more hardware processors to perform operations comprising: representing a plurality of database tables as respective vectors in a multi-dimensional vector space; receiving an indication that a first database table represented by a first vector and a second database table represented by a second vector are related to each other; responsive to the indication, moving positions of the respective vectors representing the plurality of database tables in the multi-dimensional vector space; and grouping the plurality of database tables into one or more table clusters based on the positions of the respective vectors representing the plurality of database tables in the multi-dimensional vector space.

Clause 12. The system of clause 11, wherein the operations further comprise placing database tables contained in a table cluster in a common host machine.

Clause 13. The system of any one of clauses 11-12, wherein the operations further comprise: responsive to a query command involving a database table contained in a table cluster, recommending a different database table from the table cluster.

Clause 14. The system of any one of clauses 11-13, wherein moving positions of the respective vectors representing the plurality of database tables in the multi-dimensional vector space comprises moving the second vector closer to the first vector.

Clause 15. The system of any one of clauses 11-14, wherein moving positions of the respective vectors representing the plurality of database tables in the multi-dimensional vector space comprises moving vectors representing database tables other than the first and second database tables away from the first vector.

Clause 16. The system of any one of clauses 11-15, wherein the indication comprises a join operation between the first database table and the second database table.

Clause 17. The system of any one of clauses 11-16, wherein the indication comprises a foreign key relationship between the first database table and the second database table or a view statement involving the first database table and the second database table.

Clause 18. The system of clause 17, wherein the act of moving the respective vectors representing the plurality of database tables in the multi-dimensional vector space is repeated a predefined number of times responsive to the indication.

Clause 19. The system of any one of clauses 11-18, wherein grouping the plurality of database tables comprises: measuring distances or angles between respective vectors representing the plurality of database tables in the multi-dimensional vector space; and assigning two or more database tables in a table cluster responsive to determining that the distances or angles between respective vectors representing the two or more database tables are below a predefined threshold value.

Clause 20. One or more computer-readable media having encoded thereon computer-executable instructions causing one or more processors to perform a method comprising: representing a plurality of database tables as respective vectors in a multi-dimensional vector space; receiving an indication that a first database table represented by a first vector and a second database table represented by a second vector are related to each other, wherein the indication comprises a join operation between the first database table and the second database table, a foreign key relationship between the first database table and the second database table, or a view statement involving the first database table and the second database table; responsive to the indication, moving positions of the respective vectors representing the plurality of database tables in the multi-dimensional vector space; and grouping the plurality of database tables into one or more table clusters based on the positions of the respective vectors representing the plurality of database tables in the multi-dimensional vector space.

Example 17—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
representing a plurality of database tables as respective vectors in a multi-dimensional vector space;
receiving an indication that a first database table represented by a first vector and a second database table represented by a second vector are related to each other;
responsive to the indication, moving positions of the respective vectors representing the plurality of database tables in the multi-dimensional vector space; and
grouping the plurality of database tables into one or more table clusters based on the positions of the respective vectors representing the plurality of database tables in the multi-dimensional vector space,
wherein the indication comprises a foreign key relationship between the first database table and the second database table or a view statement involving the first database table and the second database table.

2. The method of claim 1, further comprising placing database tables contained in a table cluster in a common host machine.

3. The method of claim 1, further comprising:
responsive to a query command involving a database table contained in a table cluster, recommending a different database table from the table cluster.

4. The method of claim 1, wherein moving positions of the respective vectors representing the plurality of database tables in the multi-dimensional vector space comprises moving the second vector closer to the first vector.

5. The method of claim 4, wherein moving the second vector closer to the first vector comprises reducing a distance between the first vector and the second vector by a decrement size, wherein the decrement size progressively decreases when the distance between the first vector and the second vector decreases.

6. The method of claim 1, wherein moving positions of the respective vectors representing the plurality of database tables in the multi-dimensional vector space comprises moving a third vector representing a third database table other than the first and second database tables away from the first vector.

7. The method of claim 6, wherein moving the third vector away from the first vector comprises increasing a distance between the first vector and the third vector by an increment size, wherein the increment size progressively decreases when the distance between the first vector and the third vector increases.

8. The method of claim 1, wherein the indication comprises a join operation between the first database table and the second database table.

9. The method of claim 1, wherein grouping the plurality of database tables comprises measuring distances or angles between respective vectors representing the plurality of database tables in the multi-dimensional vector space.

10. A computing system comprising:
memory;
one or more hardware processors coupled to the memory; and
one or more computer readable storage media storing instructions that, when loaded into the memory, cause the one or more hardware processors to perform operations comprising:
representing a plurality of database tables as respective vectors in a multi-dimensional vector space;
receiving an indication that a first database table represented by a first vector and a second database table represented by a second vector are related to each other;
responsive to the indication, moving positions of the respective vectors representing the plurality of database tables in the multi-dimensional vector space; and
grouping the plurality of database tables into one or more table clusters based on the positions of the respective vectors representing the plurality of database tables in the multi-dimensional vector space,
wherein the indication comprises a foreign key relationship between the first database table and the second database table or a view statement involving the first database table and the second database table.

11. The system of claim 10, wherein the operations further comprise placing database tables contained in a table cluster in a common host machine.

12. The system of claim 10, wherein the operations further comprise:
responsive to a query command involving a database table contained in a table cluster, recommending a different database table from the table cluster.

13. The system of claim 10, wherein moving positions of the respective vectors representing the plurality of database tables in the multi-dimensional vector space comprises moving the second vector closer to the first vector.

14. The system of claim 10, wherein moving positions of the respective vectors representing the plurality of database tables in the multi-dimensional vector space comprises moving vectors representing database tables other than the first and second database tables away from the first vector.

15. The system of claim 10, wherein the indication comprises a join operation between the first database table and the second database table.

16. The system of claim 10, wherein the act of moving the respective vectors representing the plurality of database tables in the multi-dimensional vector space is repeated a predefined number of times responsive to the indication.

17. The system of claim 10, wherein grouping the plurality of database tables comprises:
measuring distances or angles between respective vectors representing the plurality of database tables in the multi-dimensional vector space; and
assigning two or more database tables in a table cluster responsive to determining that the distances or angles between respective vectors representing the two or more database tables are below a predefined threshold value.

18. One or more non-transitory computer-readable media having encoded thereon computer-executable instructions causing one or more processors to perform a method comprising:
representing a plurality of database tables as respective vectors in a multi-dimensional vector space;
receiving an indication that a first database table represented by a first vector and a second database table represented by a second vector are related to each other, wherein the indication comprises a join operation between the first database table and the second database table, a foreign key relationship between the first database table and the second database table, or a view statement involving the first database table and the second database table;
responsive to the indication, moving positions of the respective vectors representing the plurality of database tables in the multi-dimensional vector space; and
grouping the plurality of database tables into one or more table clusters based on the positions of the respective vectors representing the plurality of database tables in the multi-dimensional vector space.

* * * * *